United States Patent [19]
Rosenberg et al.

[11] Patent Number: 6,125,395
[45] Date of Patent: Sep. 26, 2000

[54] METHOD FOR IDENTIFYING COLLECTIONS OF INTERNET WEB SITES WITH DOMAIN NAMES

[75] Inventors: Frank Rosenberg; Richard A. Preisig, Jr., both of New York, N.Y.

[73] Assignee: PIIQ.Com, Inc., New York, N.Y.

[21] Appl. No.: 09/411,288

[22] Filed: Oct. 4, 1999

[51] Int. Cl.⁷ .................................................... G06F 17/30
[52] U.S. Cl. ........................... 709/228; 709/201; 707/100
[58] Field of Search .................................. 709/201, 218, 709/219, 228, 245; 707/10, 4, 2, 3; 364/927

[56] References Cited

U.S. PATENT DOCUMENTS

| | | | |
|---|---|---|---|
| 4,318,184 | 3/1982 | Millett et al. | 707/100 |
| 5,257,185 | 10/1993 | Farley et al. | 707/1 |
| 5,388,196 | 2/1995 | Pajak et al. | 345/329 |
| 5,530,852 | 6/1996 | Meske | 709/228 |
| 5,626,818 | 4/1997 | Zamer et al. | 707/104 |
| 5,632,031 | 5/1997 | Velissaropoulos et al. | 707/104 |
| 5,664,177 | 2/1997 | Lowry | 707/100 |
| 5,745,899 | 4/1998 | Burrows | 707/102 |
| 5,761,529 | 6/1998 | Raji et al. | 710/4 |
| 5,768,578 | 6/1998 | Kirk et al. | 707/100 |
| 5,778,223 | 7/1998 | Velissaropoulos et al. | 707/100 |
| 5,797,008 | 8/1998 | Burrows | 707/101 |
| 5,812,595 | 9/1998 | Jandu | 375/219 |
| 5,855,013 | 12/1998 | Fisk | 707/3 |
| 5,870,750 | 2/1999 | Oyama et al. | 707/101 |
| 5,873,087 | 2/1999 | Brosda et al. | 707/100 |
| 5,897,636 | 4/1999 | Kaeser | 707/100 |
| 5,911,138 | 6/1999 | Li et al. | 707/100 |
| 5,920,864 | 7/1999 | Zhao | 707/100 |
| 5,933,830 | 8/1999 | Williams | 707/100 |
| 5,933,831 | 8/1999 | Jorgensen | 707/100 |

*Primary Examiner*—Zarni Maung
*Assistant Examiner*—Khanh Quang Dinh
*Attorney, Agent, or Firm*—Colucci & Umans

[57] ABSTRACT

A method for identifying a related collection of web sites using domain names on a global computer network is accomplished by selecting at least one descriptor corresponding to the content of each collection of web sites, using reflective characters surrounding each at descriptor to form a second level domain name and placing information for each collection of web sites under the second level domain containing the one descriptor corresponding to each collection of web sites. The method permits relevant collections of web sites to be accessed quickly. The method is particularly well suited for identifying collections of commercial web sites relating to a particular type of goods or services.

37 Claims, No Drawings

METHOD FOR IDENTIFYING COLLECTIONS OF INTERNET WEB SITES WITH DOMAIN NAMES

FIELD AND BACKGROUND OF THE INVENTION

The present invention relates generally to the field of computerized databases and, in particular, to a new and useful method of identifying collections of Internet web sites.

The Internet is a large network of interconnected computers. A particular computer or a file containing information on such a computer may be found through an "address." The address is a long combination of numbers; for example, the numeric address for a specific computer connected to the Internet might be 192.168.255.1.

The addresses identify computers containing files in specific information or interactive formats, such as Hypertext Machine Language ("HTML"). The information or interactive portions are combined to form what are now commonly referred to as web pages. Users have difficulty finding needed information on web pages for various reasons.

Aliases for the numeric address, called domain names, are usually easier to remember. The aliases often have intrinsic meaning which facilitates identification of a particular computer or world wide web site ("web site").

Presently, Internet domain names available for use by the general public in the United States include a second level domain and a top level domain ("TLD") which correspond to a numeric address and identify the physical location of a computer. Second level domains within the TLD's can currently be registered for use with a body known as ICAAN.

In the United States, five top level domains presently exist. The general public uses three of the five top level domains: .com, org and net. The remaining two top level domains are reserved for schools and government venues. The .com domain is the most popular. Other top level domains are available outside the United States. They have a two letter country code designator after the top level domain which reduces their popularity.

Second level domain names can include any combination of twenty-six characters, except for certain characters such as "i/" and ".", among others, which have special meanings. It is common for companies to utilize either their company name or an important trademark, or both. Many of these registrations are under the .com top level domain.

Second level domain names that use the .com TLD are popular for an additional reason. Internet users can use such second level domain names to bypass search engines, such as Yahoo, Excite, and Lycos, and directly access a company's web site by entering the business name as the second level domain followed by a .com extension. Internet users also use this shortcut to intuitively find companies or desired information by using company names or product names.

The Internet has become a tool for the sale of information, products and services. Many web sites offer commercial products for sale and provide the means for purchasing the desired goods by credit card with delivery by mail. It is estimated that over 200 million people will use the Internet to obtain information or goods during 1999. A business with no distribution network outside a single location can utilize the Internet and postal system to become a national company overnight. Thus, a generic or descriptive term, such as "wine," "clothes" or "tickets," as a second level domain, can be a valuable marketing mechanism reaching a larger market than is available at the marketer's physical location.

Nearly every two-, three-, and four-letter combination is presently registered as a second level domain. These combinations are popular for use because they are abbreviations of longer company names, like HP for Hewlett-Packard, or, in some cases, are actual company names, such as MCI. Similarly, many common English and foreign words and names have also been registered. Even with the advent of several new top level domains, the ".com" domain is likely to remain popular as the first choice of users finding Internet web sites by this shortcut method.

Despite their popularity, the short second level domain names do not usually provide any denotative reference "clues" about the content of a site. Although they can provide a connotation of a particular product or topic, the common word second level domain names do not provide descriptive information about the topic implied or popularly associated with their names. And, where many companies in different trades use similar terms for their names, a user cannot be certain which company can be found at a web site using the similar term. Wine.com, for example, may or may not have information about wine and may not relate to on-line sales of wine. United Airlines is not found at united.com.

Many articles have been written about the lengthy amount of time that people spend "surfing" the Internet. One reason for the length of time being spent is the inability of search engines to present lists of those web pages most relevant to the search. Search engines often return results filled with repetitive listing of the same web site, inactive web sites, or web sites containing information abstractly related to the desired topic.

To save time and effort, Internet users need a consistent method for searching organized listings of commercial web sites by topic such as product categories.

Codes in computer programs and computerized databases have been surrounded with non-letter characters or with a common character, such as in a comma-delimited database file.

U.S. Pat. No. 5,745,899, for example, discloses a search engine for Internet web pages that indexes words by pairing a word with a numeric location. Within the index database, words are separated with special characters not typically used in words, such as "@#., <>?!". These characters are used as word separators. They are not indexed in the database and are not paired. Other non-letter characters are used in pairs to set off attribute designations associated with a page. Non-letter characters such as a space or an underline are used on each end of the attribute name. The non-letter characters act as separators to indicate the presence of the named attribute. The attribute designations identify encoded word and location pairs located in specific sections of a page, such as the title or the end of the page. Since the database is encoded, the attribute information is not directly accessible by or visible to, a user entering the attribute name surrounded by non-letter characters. The attribute designators are used by the indexing program only to increase or decrease the weight given to search terms found associated with those attributes.

U.S. Pat. No. 5,797,008 discloses a similar indexing system. The patent contains the same information regarding the use of the non-letter characters as separators for data fields within the index database.

A database system which adds a division code to each end of string of data and a division code to each record in the string is disclosed by U.S. Pat. No. 5,870,750. The division codes are separators which indicate the breaks between individual data segments forming the database. The data between the separators does not otherwise identify a further collection of data.

U.S. Pat. No. 5,873,087 shows a method for using the greater than and less than symbols, ">" and "<" as brackets around data field labels. The labels are tags which identify specific information in each record. The symbols used in the labels are used only to designate the existence of the field. The labels only identify a single data item within each record.

Other patents disclose methods of identifying data in a hierarchal configuration relating data to different keywords, or identifiers.

U.S. Pat. No. 4,318,184 is for an information storage and retrieval system using a hierarchal tree system to classify and identify data. Keywords are used to identify particular data within each tree. Keywords can be combined to select a group of data for a particular item defined by the data. The keywords do not have any special identifiers connected to them.

U.S. Pat. No. 5,257,183 teaches an interactive, cross-referenced database system using a hierarchy of topics and subtopics to organize categories of information units. The identifiers for each of the topics, subtopics, and categories do not have any special form. Each information unit may have one or more qualifiers associated with the unit that can be used to select only information units having the desired qualifiers. As disclosed in the application, the qualifiers are single characters that are not part of or used directly with the information unit topic, subtopic, and category identifiers, but instead, the qualifiers are stored as part of the database.

In each of the prior art systems, the code characters are used only to separate words or data within a database and indicate the presence of a new word or data. The code characters are not used by a person interacting with the database to obtain information. Further, while it is common to use keywords to index information in databases, none of the prior art requires the user to enter additional special characters to obtain the information linked to the keyword.

SUMMARY OF THE INVENTION

The present invention provides a method for consistently identifying collections of related Internet web sites with a domain name that incorporates a descriptive term related to the subject matter of the web sites in the corresponding collection.

The invention also provides a method for easily identifying collections of Internet web sites relating to a particular topic which does not require a user to enter multiple shortcut entries or to rely upon a search engine.

In accordance with one aspect of the invention, a method of identifying a web site of interest to a user includes the steps of defining a hierarchy of subject categories having links to a plurality of web sites on a related subject, and assigning a domain name to the hierarchy comprising a descriptor for the subject categories bracketed with reflective characters. The reflective characters comprise a plurality of reflective characters bracketing the descriptor. In one preferred embodiment, the reflective characters are mirror images of each other. In further preferred embodiments, the reflective characters are the letter "p" and the letter "q" or the letter "d" and the letter "b". In still a further preferred embodiment, the reflective characters are a plurality of the letter "p" and an equal plurality of the letter "q" or a plurality of the letter "b" and an equal plurality of the letter "d."

In even a still further preferred embodiment, the reflective characters are identical, or, are identical numerals, or, are identical letters, or are a symmetrical combination selected from the group consisting of letters, numerals and letters combined with numerals.

In accordance with another aspect of the invention, a method of identifying collections of web sites is provided in which a second level domain name is created using a descriptor term bracketed by at least one pair of reflective characters. The second level domain name is the address for a web page containing a list of web sites relating to the descriptor term.

The methods of the invention are particularly useful for identifying collections of commercial web sites which offer goods or services for sale. In such cases, the descriptor is a term which relates to a particular class of goods. The second level domain name is formed by surrounding the descriptor term by a pair of reflective characters. The second level domain name is then used as the address for a listing of preselected web sites relating to the class of goods. The web sites are preselected based on content and availability of on-line shopping; sites which do not contain related goods or which contain wholly trivial information are excluded.

In accordance with an advantage of the methods of the invention, by use of a consistent set of reflective characters, Internet users can quickly, efficiently, and intuitively find web sites have substantial content relating to their topics of interest.

In accordance with a further advantage of the invention, the bracketing of a descriptor with reflected characters increases the number of domain names which include an intuitive description including three or four letter words.

The various feathres of novelty which characterize the invention are pointed out with particularity in the claims annexed to and forming a part of this disclosure. For a better understanding of the invention, its operating advantages, and specific objects attained by its uses, reference is made to the accompanying descriptive matter in which preferred embodiments of the invention are illustrated.

DESCRIPTION OF THE PREFERRED EMBODIMENTS

In accordance with the invention, web sites relevant to a topic of interest may be quickly identified using a domain name having a descriptor bracketed by reflective characters. As used herein, "descriptor" is intended to identify a descriptive term such as "travel or "car rental" or a company name or trademark among other things. Bracketing refers to the placement of a reflective character or characters, as further described herein, at each end of the descriptor. Collections or databases of Internet web sites or of other information sets having a common theme are researched and collected using a second level domain name (within one of the available TLDs) which contains a descriptor, which may be a descriptive term, related to the common theme. The descriptor is surrounded, or bracketed, by reflective characters. Thus, in accordance with the invention, different collections are each identified using a second level domain name containing a descriptor bracketed by a pair of reflective characters.

The term "reflective character" as used herein is intended to mean any single character used in matched pairs, or, more preferably, any single character that is substantially symmetrical about the vertical axis of the character or a pair of characters which are substantially mirror images of each other. The characters must be characters which are allowable characters for use in a domain name, so that they can be used as brackets, or bookends, for the descriptor of the second level domain name. Perfect symmetry and perfect mirror images are not essential, and, in fact, the degree of reflection will vary depending on the font being used. It is only necessary that the user perceive the character to be substantially symmetrical or mirror images of each other.

The pairings in the table below are considered reflective characters for the purposes of this invention. In the case of letter characters, where the lower and uppercase forms both have the required symmetry, the table is intended to encompass those variants.

| Matched Pairs | a pair of A's, a pair of B's, a pair of C's, etc. |
|---|---|
| Symmetric | a pair of 8's, a pair of 0's, a pair of T's, a pair of 1's, a pair of I's, a pair of U's, a pair of A's, a pair of M's, a pair of O's, a pair of X's, a pair of H's, a pair of Y's, a pair of W's, and a pair of V's |
| Mirrored | p and q, d and b, s and z, and E and 3, < and > |

Although a single reflective character is preferable on each side of the descriptor, such as ptravelq.com multiple such characters may also be used, e.g. pptravelqq.com.

The descriptor could be any word or term which has meaning or significance in relation to a particular subject or type of goods or services. For example, generic or descriptive terms may be preferred to clearly convey to specific information, goods and services.

Each second level domain name created using the method of the invention is registered for use and made active, in accordance with the currently recognized domain name registration procedure, so that a computer connected to the Internet can be recognized as being the location of the domain name. Then, a web site is created and placed on the computer identified by that second level domain name as part of that domain. The web site at the second level domain name, formed by the descriptor bracketed by reflective characters, contains hyperlinks or other means for accessing web sites in a collection. All of the sites relate to the descriptor term in the second level domain name. The user may also access other collections of information that are maintained, in addition to collections of web sites. These additional information sets are herein called internal sites.

The topics and contents of the collections of web sites are pre-determined by the registered owner of the second level domain names. The owner of a series of web sites with the same bookends, for example, bracketed by reflective characters such as the letter "p" and the letter "q," i.e., p_q.com, can establish a variety of well researched and value added content for many diverse topics. Consequently, the method provides a means for expending the number of names that can be intuitively researched, with extra value for the Internet user, while making the site more attractive to persons offering products or services in the United States or to advertisers, thereby benefitting the owner of the site by providing a reasonable return on its investment in enhancing the site. The web sites identified in the collections will all be relevant to the selected topic. If the topic is "travel," for example, the web site may contain airline web sites which sell tickets via Internet, resort and hotel web sites offering vacation and room bookings, and rental car web sites offering Internet reservations. The collection will not contain random individuals' in-depth diaries of their trips to Timbuktu or Siberia or unrelated web sites which use "travel" as a metatag or search string keyword used by search engines as a method of redirecting web users, since the content of the internal site will be selected to be consistent with information being sought by the user.

Symmetric characters may be particularly preferred in practicing the invention when the same symmetric characters are consistently used, an Internet user can quickly retrieve a particular collection of Internet web sites and internal sites by simply typing in a descriptive word relating to the collection of sites the user is trying to access, surrounded by the known pair of symmetric characters. In order to improve the likelihood that a user will find the appropriate sites more rapidly, many different terms relating to the collection surrounded by the same symmetric characters are registered as domain names, and all of these domain names point to the same web page containing the collection. Domain names with the same terms in different languages, for example, surrounded by the symmetric characters, can be used to point to the same web site.

In an even more preferred embodiment, the reflective characters are a mirror image set, such as "p" and "q", "d" and "b," "pp" and "qq," and, "ppp" and "qqq." In order to access the "travel" collection described above, an Internet user could set their browser to display the contents located at ptravelq.com. In the event that the user is looking for airlines, which are contained in the "travel" collection, the domain name pairlineq.com will point to the ptravelq.com site. The same is true for locating resorts, i.e., presortq.com, locating hotels, i.e., photelq.com or locating rental cars, i.e., prentalcarq.com. In addition to foreign language equivalents, plurals and common misspellings of the descriptive words could be bracketed by the reflective characters to function in the same manner, so that a user is not hampered by these minor, but essential, differences in the Internet domain name.

Hyperlinks for accessing each web site in a collection can be placed at a primary one of the second level domains, while multiple alternate domain names relating to the same topic as the primary domain name will contain a pointer or link to the primary domain name. Then, regardless of what descriptor term bracketed by reflective characters is used as a domain name to find the collection, the user will be directed to the correct collection located at the primary domain name. The descriptor thus is actually any one of many descriptive terms which may vary in spelling and/or in the actual word used, but which share a common intended meaning.

If more classification and subdividing of topics is desired, the ptravelq.com site may contain links to a grouping of airline sites under pairlineq.com, a grouping of car rental company sites under pcarrentalq.com and a grouping of resort hotel sites under presortq.com. In this case, the alternative spellings, foreign language equivalents and synonyms of each descriptor term would also be registered with similar reflective character brackets and be made to point to the appropriate primary domain name. This alternative, using the above example, allows a user to go immediately directly to a collection of only airlines sites, only car rental sites and only resort hotels.

A user who is made aware of the reflective characters used to bracket the descriptive terms can quickly and easily find available collections of web sites relating to their topic of interest simply by typing in a keyword for the descriptor surrounded by the reflective characters as the web address. Further, the invention offers an improvement over the present situation in which owners of domain names formed from generic terms for goods or topics are not necessarily owned by one entity or have no obvious connection to each other. Using the method of the invention, a domain name owner using consistent pairs of reflective characters surrounding the descriptor terms of each domain name creates an association between each of the domain names with the reflective characters. The association provides more assistance to a user who may be used to accessing, for example, ptravelq.com for travel-related goods and services, and pclothesq.com for apparel, but is now interested in buying a gift. The user can then instinctively access pgiftsq.com to find a collection of web sites offering gift-type goods and services via the Internet.

As an alternative, the user may access a central web site which contains links to each of the collections identified by their descriptor between a pair of reflective letters. The central web site provides a navigation bar which is always present and can be used to quickly jump from site to site within a collection and to another collection while a previously accessed site is framed within the central web site. Framing occurs where the information, including text and graphics, from a framed web site is presented within a host web site without leaving the host web site.

The identification method of the invention expands the number of useful and meaningful second level domain names within each top level domain while making Internet navigation simpler for users. By identifying multiple relevant web sites in each collection of web sites, the invention facilitates Internet searches by eliminating useless trivia and non-relevant commercial web sites from the collection of sites that is accessed by a keyword.

Although the method is particularly useful for creating second level domains, it is easily adaptable for use as lower-tier domain names, in the event that top level domains are ever eliminated from the domain name address identifier. In each case, a descriptor term bracketed by at least a pair of reflective characters can be used as the basic global computer network address for the collection of web sites, regardless of other required components of the address.

While a specific embodiment of the invention has been shown and described in detail to illustrate the application of the principles of the invention, it will be understood that the invention may be embodied otherwise without departing from such principles.

What is claimed is:

1. A method of identifying a web site of interest to a user comprising the steps of:
    defining a hierarchy of subject categories having links to a plurality of web sites on a related subject, and
    assigning a domain name to the hierarchy comprising a descriptor for the subject categories bracketed with reflective characters; wherein the reflective characters surrounding each at least one descriptive term to form a second level domain name.

2. A method as set forth in claim 1 wherein the reflective characters comprise a plurality of reflective characters bracketing the descriptor.

3. A method as set forth in claim 1 wherein the reflective characters are mirror images of each other.

4. A method as set forth in claim 3 wherein the reflective characters comprise the letter "p" and the letter "q".

5. A method as set forth in claim 3 wherein the reflective characters comprise a plurality of the letter "p" and an equal plurality of the letter "q".

6. A method as set forth in claim 3 wherein the reflective characters comprise the letter "d" and the letter "b".

7. A method as set forth in claim 3 wherein the reflective characters comprise a plurality of the letter "d" and an equal plurality of the letter "b".

8. A method as set forth in claim 1 wherein the reflective characters are identical.

9. A method as set forth in claim 1 wherein the reflective characters are identical numerals.

10. A method as set forth in claim 1 wherein the reflective characters are identical letters.

11. A method as set forth in claim 1 wherein the reflective characters are symmetrical combination selected from the group consisting of letters, numerals and letters combined with numerals.

12. A method for identifying a related collection of web sites using alphanumeric domain names on a global computer network, comprising:
    selecting at least one descriptor term corresponding to the content of each web site collection in the collection of web sites;
    using reflective characters surrounding each at least one descriptive term to form a second level domain name;
    placing information for each collection of web sites under the second level domain containing the at least one descriptive term corresponding to said collection of web sites.

13. A method according to claim 12, wherein the information comprises at least one hyperlink to a web site in each collection of web sites.

14. A method according to claim 12, wherein the reflective characters are mirror image characters.

15. A method according to claim 14, wherein the mirror image characters comprise a letter.

16. A method according to claim 12, the reflective characters comprise a pair of symmetric characters.

17. A method according to claim 16, wherein the symmetric characters are selected from the group consisting of a pair of 8's, a pair of 0's, a pair of T's, a pair of l's, a pair of I's, a pair of U's, a pair of A's, a pair of M's, a pair of O's, a pair of X's, a pair of H's, a pair of Y's, a pair of W's, and a pair of V's.

18. A method for identifying collections of global computer network web sites, the method comprising:
    providing a collection of web sites containing web sites relating to a common topic;
    selecting a descriptor term having meaning or significance for each common topic;
    bracketing each at least one descriptor term with reflective characters to create at least a portion of an address for a computer connected to the global computer network, at least one address being created for each common topic;
    activating each of the valid addresses; and
    providing means for accessing the web sites in the collection of web sites at the at least one valid address created for each common topic.

19. A method according to claim 18, further comprising, creating a plurality of addresses for each common topic and linking the plurality of addresses to a primary one of the addresses, the means for accessing the web sites in each collection provided at the primary valid address.

20. A method for searching a global network of interconnected computers for information about a selected field of interest, the network including a multiplicity of web sites that are each identified by at least one domain name containing a permitted top level domain name and an arbitrary second level domain name, the method comprising:

connecting to the global network;

inputting a selected domain name into the global network, the selected domain name containing a permitted top level domain name and a selected second level domain name, the selected second level domain name comprising a descriptor which has a meaning that is associated with the selected field of interest and a set of related reflective characters, at least one of the reflective characters of the set being immediately before the descriptor and at least one of the reflective characters of the set being immediately after the descriptor; and using the inputted selected domain name to access a collection of related sites which each contain information about the selected field of interest.

21. A method according to claim 20, wherein the selected second level domain name consists essentially of the set of reflective characters and the descriptor.

22. A method according to claim 20, wherein the set of reflective characters includes a pair of substantially mirror image characters.

23. A method according to claim 20, wherein the set of reflective characters includes a pair of substantially symmetrical characters.

24. A method according to claim 20, wherein the descriptor comprises one of a plurality of descriptive terms and variations in spelling of terms which are all related to the selected field of interest.

25. A method according to claim 20, wherein the collection of sites comprised a collection of web sites on the global network.

26. A method according to claim 20, including maintaining a plurality of collections of related sites at a service provider, using the inputted selected domain name to access the service provider and connect to the collection of related sites that is associated with the selected field of interest at the service provider.

27. A method according to claim 26, wherein each of the plurality of collections of sites comprised a collection of web sites on the global network.

28. A method according to claim 26, wherein each of the plurality of collections of sites comprises a collection of internal sites maintained by the service provider.

29. A method for providing access to information about a selected field of interest on a global network of interconnected computers, the network including a multiplicity of web sites that are each identified by at least one domain name containing a permitted top level domain name and an arbitrary second level domain name, the method comprising:

maintaining a plurality of collections of related sites, each collection being associated with a selected field of interest, the collections being accessible on the global network;

selecting at least one descriptor for each collection, the descriptor for each respective collection have a meaning that is associated with its respective collection; and establishing access on the global network, to each collection, based on receipt of a respective selected domain name for each collection, the selected domain name containing a permitted top level domain name and a selected second level domain name, the selected second level domain name comprising one of the descriptors which has a meaning that is associated with the selected field of interest and with a respective collection to be accessed, and a set of related reflective characters, at least one of the reflective characters of the set being immediately before the one descriptor and at least one of the reflective characters of the set being immediately after the one descriptor.

30. A method according to claim 29, wherein the selected second level domain name consists essentially of the set of reflective characters and the descriptor.

31. A method according to claim 29, wherein the set of reflective characters includes a pair of substantially mirror image characters.

32. A method according to claim 29, wherein the set of reflective characters includes a pair of substantially symmetrical characters.

33. A method according to claim 29, wherein each descriptor comprises one of a plurality of descriptive terms and variations in spelling of terms which are all related to a respective selected field of interest.

34. A method according to claim 29, wherein the collection of sites comprised a collection of web sites on the global network.

35. A method according to claim 29, including maintaining the plurality of collections of related sites at a service provider, using the selected domain name to access the service provider, and connecting a user to the respective collection of related sites that is associated with the selected field of interest at the service provider.

36. A method according to claim 35, wherein each of the plurality of collections of sites comprised a collection of web sites on the global network.

37. A method according to claim 35, wherein each of the plurality of collections of sites comprises a collection of internal sites maintained by the service provider.

* * * * *